United States Patent
Nakagawa (10) Patent No.: US 11,818,234 B2
(45) Date of Patent: Nov. 14, 2023

(54) METHODS AND SYSTEMS FOR TRANSMITTING MESSAGES USING COMMUNICATION PROTOCOLS SPECIFIC TO DATA FORMATS OF THESE MESSAGES

(71) Applicant: TOYOTA MOTOR ENGINEERING & MANUFACTURING NORTH AMERICA, INC., Plano, TX (US)

(72) Inventor: Masashi Nakagawa, Sunnyvale, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 256 days.

(21) Appl. No.: 17/085,079

(22) Filed: Oct. 30, 2020

(65) Prior Publication Data

US 2022/0141317 A1    May 5, 2022

(51) Int. Cl.
*H04L 29/06* (2006.01)
*H04L 69/08* (2022.01)
*H04L 67/12* (2022.01)

(52) U.S. Cl.
CPC .............. *H04L 69/08* (2013.01); *H04L 67/12* (2013.01)

(58) Field of Classification Search
CPC ................. H04L 69/08; H04L 67/12
See application file for complete search history.

(56) References Cited

U.S. PATENT DOCUMENTS

| | | | |
|---|---|---|---|
| 2017/0289356 A1 | 10/2017 | Webb et al. | |
| 2019/0050718 A1* | 2/2019 | Tickoo | G06N 3/10 |
| 2019/0132424 A1* | 5/2019 | Jeong | H04L 69/08 |
| 2019/0322229 A1 | 10/2019 | Al Abed | |
| 2020/0081699 A1* | 3/2020 | Majed | G06F 8/65 |

FOREIGN PATENT DOCUMENTS

| | | |
|---|---|---|
| CN | 202486315 U | 10/2012 |
| JP | 2009012585 A | 1/2009 |
| JP | 2010098626 A | 4/2010 |
| JP | 2018117500 A | 7/2018 |
| WO | 2020/097221 A1 | 5/2020 |

OTHER PUBLICATIONS

Clark et al, Vehicle to Vehicle file sharing system and method, DE 102020100593, (Year: 2020).*

* cited by examiner

*Primary Examiner* — Kim T Nguyen
(74) *Attorney, Agent, or Firm* — Dinsmore & Shohl LLP (57) ABSTRACT

A vehicle and methods for transmitting messages to external devices by identifying and utilizing communication protocols that are specific to the data formats of these messages, is provided. The method includes generating, by an electronic control unit of a vehicle, a message in a data format, transferring, by the electronic control unit, the message in the data format to a data communication module of the vehicle, identifying, by the data communication module, a communication protocol associated with the data format of the message, and transmitting to a server that is external to the vehicle, by the data communication module, the message in the data format using the communication protocol.

20 Claims, 7 Drawing Sheets

METHODS AND SYSTEMS FOR TRANSMITTING MESSAGES USING COMMUNICATION PROTOCOLS SPECIFIC TO DATA FORMATS OF THESE MESSAGES

TECHNICAL FIELD

The embodiments described herein generally relate to identifying and utilizing particular communication protocols for transmitting messages, and more specifically, to transmitting messages to external devices by identifying and utilizing communication protocols that are specific to the data formats of these messages.

BACKGROUND

Conventional vehicle systems include one or more electronic control units that are configured to individually communicate with external devices. Additionally, conventional vehicle systems include data communication modules that transmit data to external devices using communication protocols that are fixed. Consequently, these vehicle systems may suffer from latency issues, bandwidth constraints, transmission delays, and so forth.

Accordingly, a need exists for a vehicle system that effectively manages communications between various components of the vehicle system and devices that are external to the vehicle system.

SUMMARY

In one embodiment, a vehicle that is configured to transmit messages to external devices by identifying and utilizing communication protocols that are specific to the data formats of these messages, is provided. The vehicle includes a data communication module and an electronic control unit. The electronic control unit is programmed to generate a message in a data format, and transfer the message in the data format to the data communication module. The data communication module is configured to identify, upon receiving the message, a communication protocol specific to the data format of the message, and transmit the message, in the communication protocol specific to the data format of the message, to a server that is external to the vehicle.

In another embodiment, a method for transmitting messages to external devices by identifying and utilizing communication protocols that are specific to the data formats of these messages, is provided. The method includes generating, by an electronic control unit of a vehicle, a message in a data format, transferring, by the electronic control unit, the message in the data format to a data communication module of the vehicle, identifying, by the data communication module, a communication protocol associated with the data format of the message, and transmitting to a server that is external to the vehicle, by the data communication module, the message in the data format using the communication protocol.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments disclosed herein describe methods and systems for transmitting messages by identifying and using communication protocols that are specific to the data formats of these messages. For example, the vehicle system described herein includes a data communication module that is configured to identify, in real time, communication protocols that are appropriate for and specific to the data formats of messages that, e.g., may be transferred to the data communication module from one or more electronic control units within the vehicle system. The data communication module may then transmit these messages using the respective identified communication protocols to one or more external devices. In short, the vehicle system described herein includes a data communication module that operates as a gateway that controls communications between the electronic control units and one or more devices that are external to the vehicle system. Consequently, bandwidth utilization and efficiency of the vehicle system is improved because the electronic control units do not have to individually communicate with external devices, identify appropriate protocols, and perform other such actions. In embodiments, the manner in which the electronic control units (and other components) operate with the data communication module and one or more external devices is associated with a software-defined networking (SDN) technology, which enables dynamic and programmatically efficient network configuration and operation. SUN also improves network performance, routing processes, and bandwidth efficiency.

Figure 1:
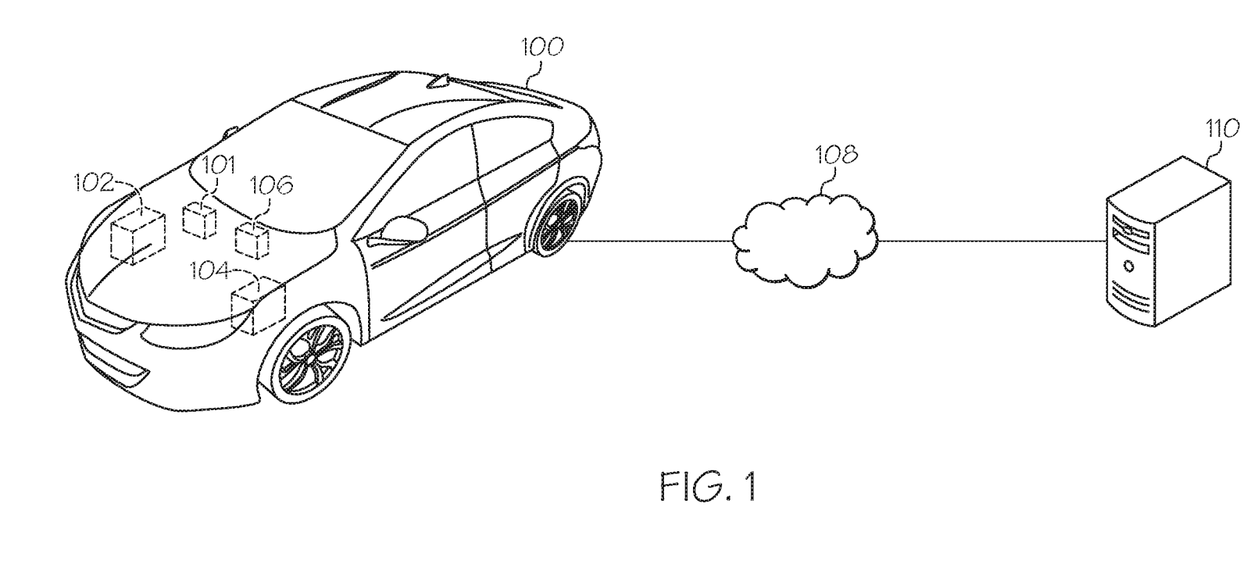
FIG. 1 schematically depicts a vehicle including a vehicle system that is configured to transmit messages to external devices by identifying and utilizing communications protocols that are specific to the data formats of these messages, according to one or more embodiments described and illustrated herein.

Referring now to the drawings, FIG. 1 schematically depicts a vehicle 100 including a vehicle system (not shown in FIG. 1, but depicted in FIG. 2) that is configured to transmit messages to external devices by identifying and utilizing communications protocols that are specific to the data formats of these messages, according to one or more embodiments described and illustrated herein.

As illustrated, the vehicle 100 includes electronic control units 101, 102, 104, and a data communication module 106. In embodiments, the electronic control units 101, 102, 104 may generate messages in different data formats. For example, electronic control unit 101 may generate a message in the data format of a control command, while electronic control units 102, and 104 generates messages in data formats of digital images and text messages, respectively. In embodiments, each of the electronic control units 101, 102, 104 may be configured to generate messages in a variety of different data formats. Thereafter, the electronic control units 101, 102, 104 may transfer messages, via communication paths of the vehicle system (depicted in FIG. 2, but not shown in FIG. 1), to the data communication module 106.

Upon receipt of these messages, the data communication module 106 may identify communication protocols that are specific to the respective data formats of these messages. In embodiments, the importance of the messages (e.g., the criticality of the messages to the operation of the vehicle 100), the data format of these messages (among other factors), are utilized by the data communication module 106 to identify appropriate communication protocols. The data communication module 106 may identify appropriate communication protocols by operating in conjunction with one or more memory modules (depicted in FIG. 2, but not shown in FIG. 1) and one or more processors (depicted in FIG. 2, but not shown in FIG. 1) of the vehicle system described herein. Moreover, the data communication module 106 is configured to change communication protocols, in real time, upon receiving one or more messages from the electronic control units 101, 102, 104. For example, in embodiments, the data communication module 106 may receive a first message in a data format from the electronic control unit 101, and then receive second and third messages in different data formats from the electronic control units 102, 104. In embodiments, the data communication module 106 may identify an appropriate communication protocol for the first message, and then identify different communication protocols, in real time, that are appropriate for the second and third messages.

Thereafter, the data communication module 106 may transmit these messages to one or more external devices (e.g., the cloud server 110) via a communication network 108 and receive one or more messages in response. It is noted that the communication network 108 may vary, depending on the communication protocol identified by the data communication module 106. In embodiments, the received messages may be delivered via a communication protocol that is the same as the communication protocol that was used to transmit these messages. A plurality of communication protocols may be identified and utilized, e.g., TCP, UDP, NTTP, and so forth. The vehicle system described herein is configured to identify, in real time, communication protocols that are specific to the data format of messages received from one or more of the electronic control units 101, 102, 104, and utilize the data communication module 106 as a gateway for routing messages to and from each of the electronic control units 101, 102, 104 to one or more external devices. It is further noted that the data communication module 106 is configured to control and overwrite any server addresses (e.g., uniform resource locators) that may be associated with each of these messages and with the electronic control units from which these messages are transferred. In this way, the data communication module 106 exercises significant control over the communications between the electronic control units 101, 102, 104 and one or more external devices. Such control reduces the bandwidth utilization of the vehicle system, while also ensuring safe, secure, and appropriate transmission of messages from the electronic control units 101, 102, 104 to one or more external devices.

Figure 2:
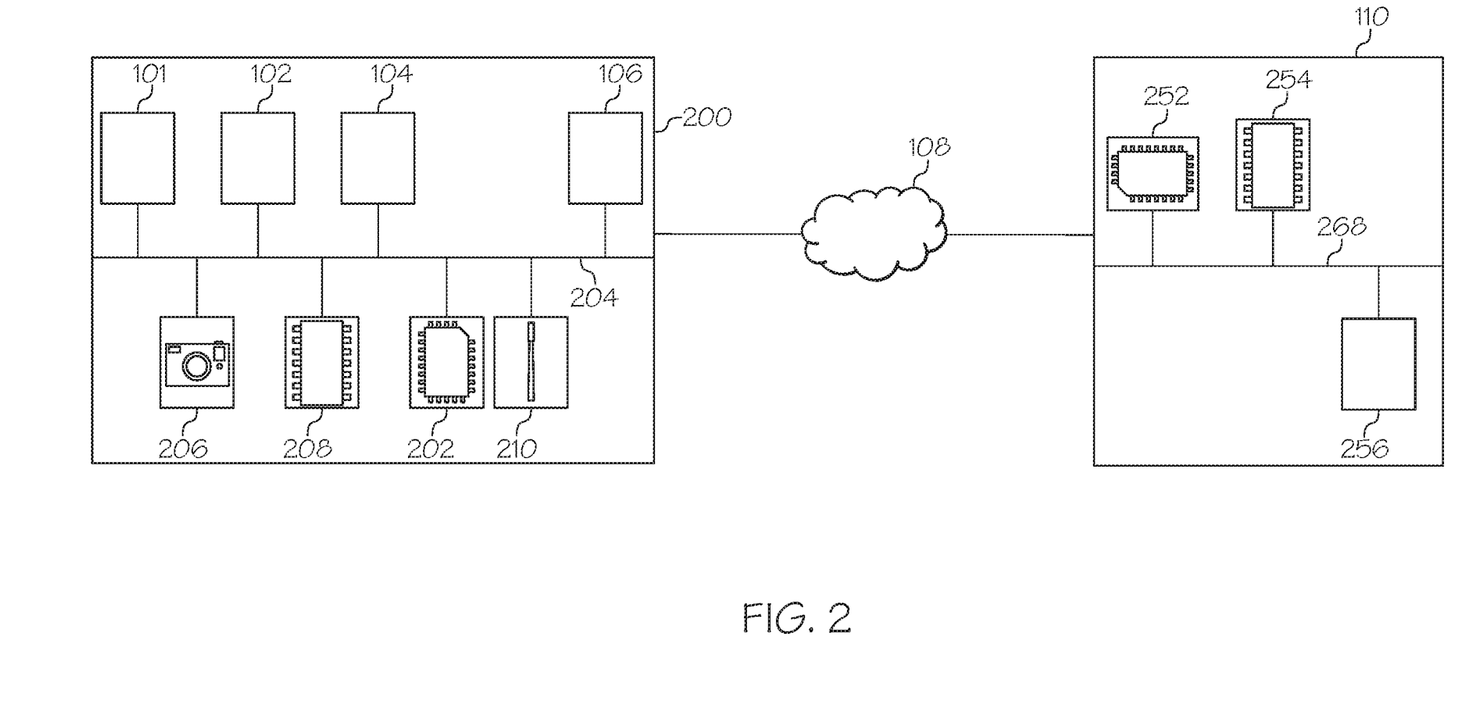
FIG. 2 schematically depicts non-limiting components of a vehicle system and a cloud server, according to one or more embodiments shown herein.

FIG. 2 schematically depicts non-limiting components of a vehicle system 200 and the cloud server 110, according to one or more embodiments shown herein. Notably, while the vehicle system 200 is depicted in isolation in FIG. 2, the vehicle system 200 may be included within a vehicle. For example, the vehicle system 200 may be included within the vehicle 100. In embodiments in which the vehicle system 200 is included within the vehicle 100, such a vehicle may be an automobile or any other passenger or non-passenger vehicle such as, for example, a terrestrial, aquatic, and/or airborne vehicle. In some embodiments, the vehicle is an autonomous vehicle that navigates its environment with limited human input or without human input.

In embodiments, the vehicle system 200 includes one or more processors 202, a communication path 204, a camera 206, one or more memory modules 208, a satellite antenna 210, a data communication module 106 (e.g., a network hardware interface), and electronic control units 101, 102, 104. The various components of the vehicle system 200 and the interaction thereof, the various components of the cloud server 110, and the communication network 108 will be described in detail below. It is noted that the communication network 108 may vary, depending on the communication protocols identified by the data communication module 106.

Referring to FIG. 2, electronic control units 101, 102, and 104 may each includes one or more processors (not shown), one or more memory modules (not shown), and communication paths (not shown). These processors may be controllers, integrated circuits, microchips, computers, or any other computing devices. The one or more memory modules may comprise RAM, ROM, flash memories, hard drives, or any devices capable of storing machine readable and executable instructions such that the machine readable and executable instructions can be accessed by the one or more processors. Additionally, these electronic control units, as part of the vehicle system 200, may be configured to operate on conjunction with, transfer data to, and receive data from various vehicle components of the vehicle 100, including the brakes, airbags, cruise control, electric power steering, battery condition, and so forth. Additionally, these electronic control units 101, 102, 104 are configured to operate in conjunction with one or more of the components of the vehicle system 200, e.g., the data communication module 106, the one or more processors 202, the camera 206, and so forth.

The vehicle system 200 includes the data communication module 106 for communicatively coupling the vehicle system 200, and in particular the electronic control units 101, 102, 104 with the cloud server 110 (and other external devices), e.g., via communication network 108. The data communication module 106 is coupled to the communication path 204 such that the communication path 204 communicatively couples the data communication module 106 to other modules of the vehicle system 200. The data communication module 106 may be any device capable of transmitting and/or receiving data via a wireless network. Accordingly, the data communication module 106 may include a communication transceiver for sending and/or receiving data according to any wireless communication standard. For example, the data communication module 106 may include a chipset (e.g., antenna, processors, machine readable instructions, etc. to communicate over wireless computer networks using various communication protocols such as, for example, TCP, UDP, NTTP, wireless fidelity (Wi-Fi), WiMax, Bluetooth, IrDA, Wireless USB, Z-Wave, ZigBee, or the like. In some embodiments, the data communication module 106 includes a Bluetooth transceiver that enables the vehicle system 200 to exchange information with the cloud server 110 via Bluetooth communication. Furthermore, in embodiments, the data communication module 106 is configured to identify a suitable communication protocol for one or more messages that may be received from one or more of the electronic control units 101, 102, 104 based on the data format of the message that is received from a particular electronic control unit. In embodiments, depending on various factors, e.g., criticality of the message, data format of the message, and so forth, the data communication module may change, in real time, an identified communication protocol.

Communication protocols include multiple layers as defined by the Open Systems Interconnection Model (OSI model), which defines a telecommunication protocol as having multiple layers, e.g., Application layer, Presentation layer, Session layer, Transport layer, Network layer, Data link layer, and Physical layer. To function correctly, each communication protocol includes a top layer protocol and one or more bottom layer protocols. Examples of top layer protocols (e.g., application layer protocols) include HTTP, HTTP2 (SPDY), and HTTP3 (QUIC), which are appropriate for transmitting and exchanging data in general formats. Application layer protocols such as RTP and RTCP may be appropriate for various real time communications such as, e.g., telephony and messaging. Additionally, SSH and SFTP may be appropriate for secure maintenance, MQTT and AMQP may be appropriate for status notification and wakeup trigger, and MPEG-DASHIHLS may be appropriate for live video streaming with user-end systems such as a web browser. Examples of transport layer protocols that are selected by the various application layer protocols listed above include, e.g., TCP, QUIC/SPDY, SCTP, DCCP, UDP, and RLDP.

The vehicle system 200 includes one or more processors 202. Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the system. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that the coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The camera 206 of the vehicle system 200 may be coupled to a communication path 204, which provides signal interconnectivity between various components of the vehicle system 200. The camera may be any device having an array of sensing devices capable of detecting radiation in an ultraviolet wavelength band, a visible light wavelength band, or an infrared wavelength band. The camera may have any resolution. In some embodiments, one or more optical components, such as a mirror, fish-eye lens, or any other type of lens may be optically coupled to the camera. In embodiments, the camera may have a broad angle feature that enables capturing digital content within a 150 degree to 180 degree arc range. Alternatively, the camera may have a narrow angle feature that enables capturing digital content within a narrow arc range, e.g., 60 degree to 90 degree arc range. In embodiments, the one or more cameras may be capable of capturing high definition images in a 720 pixel resolution, a 1080 pixel resolution, and so forth. Alternatively or additionally, the camera may have the functionality to capture a continuous real time video stream for a predetermined time period.

The vehicle system 200 also includes one or more memory modules 208 coupled to the communication path 204. The one or more memory modules 208 may comprise RAM, ROM, flash memories, hard drives, or any device capable of storing machine readable and executable instructions such that the machine readable and executable instructions can be accessed by the one or more processors 202 or one or more of the electronic control units 101, 102, 104. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 208. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. In some embodiments, the one or more memory modules 208 may store data related to status and operating condition information related to e or more vehicle components, e.g., brakes, airbags, cruise control, electric power steering, battery condition, and so forth.

Still referring to FIG. 2, the vehicle system 200 optionally includes a satellite antenna 210 coupled to the communication path 204 such that the communication path 204. communicatively couples the satellite antenna 210 to other modules of the vehicle system 200. The satellite antenna 210 is configured to receive signals from global positioning system satellites. Specifically, in one embodiment, the satellite antenna 210 includes one or more conductive elements that interact with electromagnetic signals transmitted by global positioning system satellites. The received signal is transformed into a data signal indicative of the location (e.g., latitude and longitude) of the satellite antenna 210 or an object positioned near the satellite antenna 210, by the one or more processors 202 and/or one or more of the electronic control units 101, 102, and 104.

Still referring to FIG. 2, the cloud server 110 includes one or more processors 252, one or more memory modules 254, network interface hardware 256, and a communication path 268. The one or more processors 252 may be a controller, an integrated circuit, a microchip, a computer, or any other computing device. The one or more memory modules 254 may comprise RAM, ROM, flash memories, hard drives, or any device capable of storing machine readable and executable instructions such that the machine readable and executable instructions can be accessed by the one or more processors 252. The network interface hardware 256 communicates with various external device, e.g., the data communication module 106 of the vehicle system 200. All of the components within the cloud server 110 may be coupled to a communication path 268. It is further noted that remote server 610 (not shown in FIG. 2, but depicted in FIG. 6 of the present disclosure) includes one or more processors that are substantially similar to the one or more one or more processors 252, one or more memory modules that are substantially similar to the one or more memory modules 254, a network interface hardware that is substantially similar to the network interface hardware 256, and a communication path that is substantially similar to the communication path 268.

Figure 3:
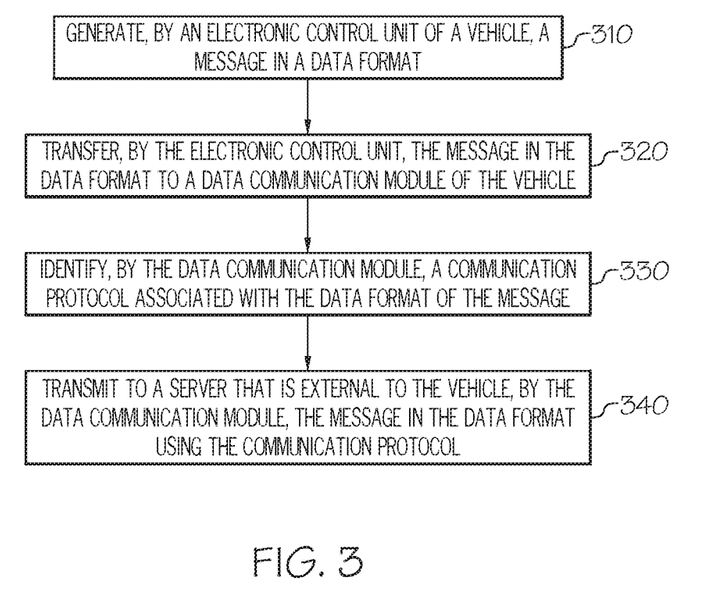
FIG. 3 schematically depicts a flowchart for transmitting messages to external devices by identifying and utilizing communication protocols that are specific to the data formats of these messages, according to one or more embodiments described and illustrated herein.

FIG. 3 schematically depicts a flowchart for transmitting messages to external devices by identifying and utilizing communication protocols that are specific to the data formats of these messages, according to one or more embodiments described and illustrated herein.

In embodiments, in block 310, the electronic control units 101, 102, and 104 of the vehicle system 200 may generate messages in particular data formats. For example, the electronic control units 101, 102, and 104 may each be capable of performing one or more actions such as generating videos, digital images, audio messages, text messages, control command messages, and so forth. In embodiments, the electronic control units 101, 102, 104 may be configured to perform a plurality of functions including, e.g., receiving and analyzing data collected from a various sensors of a vehicle. It is noted that the electronic control units 101, 102, 104 may perform these functions independently (using one or more processors included within these units) and/or in conjunction with the one or more processors 202 of the vehicle system 200 of the vehicle 100.

For example, in embodiments, the electronic control units 101, 102, 104 may generate videos, digital images, and so forth, based on digital images or video stream data captured by one or more cameras of the vehicle (e.g., camera 206 of the vehicle system 200). Alternatively or additionally, the electronic control units 101, 102, 104 may receive and analyze data collected from a microphone (not shown). For example, the electronic control units 101, 102, 104 may analyze an instruction spoken by a human, to generate a text based message or query. In embodiments, the camera 206 may transfer captured video streams, digital images, and so forth, to the electronic control units 101, 102, 104 via the communication path 204. The microphone may transfer audio messages via the communication path 204 to the electronic control units 101, 102, 104.

Alternatively or additionally, the electronic control units 101, 102, 104 may receive and analyze data collected from various components of the vehicle to generate one or more control commands. For example, the electronic control units 101, 102, 104 may collect, track, and analyze data from various components of the vehicle 100 in real time. In embodiments, the electronic control units 101, 102, 104 may collect, track, and analyze the status, operating conditions, and so forth of various components of the vehicle 100, e.g., airbags, vehicle brakes, cruise control, electric power steering, battery condition, and so forth. It is noted that data related to various other vehicle component operating conditions may also be collected and analyzed. It is also noted that the status data related to these components may be important or critical to maintaining the safe operation of the vehicle 100. Thus, such status data will be transmitted by the vehicle system 200 of the vehicle 100 to one or more external devices (e.g., the cloud server 110) in a secure manner, e.g., in the data format of a control command using a secure communication protocol. It is further noted that control command data may be transmitted to one or more external devices (e.g., the cloud server 110) for further analysis. Additionally, in embodiments, the cloud server 110 may also transmit control commands to the vehicle system 200 via a safe and secure communication protocol, e.g., software updates, firmware updates, a remote control signal, and so forth. Details regarding the transmission and reception of control commands will be described later on in this disclosure.

In embodiments, in block 320, the electronic control units 101, 102, 104 may transfer the messages, which are generated by these units, to the data communication module 106 of the vehicle 100. In embodiments, these messages may be transferred via the communication path 204. It is noted that the data communication module 106 may receive these messages simultaneously or sequentially from all the electronic control units 101, 102, 104. For example, in embodiments, the electronic control unit 101 may transfer a message as a control command, while the electronic control units 102, 104 may transfer audio messages or text messages, messages including video streams, or message including digital images. It is noted that each of the electronic control units 101, 102, 104 may be configured to generate and transfer messages in one or more data formats. Alternatively, each of the electronic control units 101, 102, 104 may be dedicated to generate and transfer data in a particular data format. Other permutations and combinations of such operations are contemplated for each of the electronic control units 101, 102, 104.

Thereafter, in embodiments, in block 330, the data communication module 106 may identify communication protocols associated with or specific to the data formats of the messages that are transferred by the electronic control units 101, 102, 104. For example, if the data communication module 106 receives a message in the form of a control command (e.g., a particular data format) the data communication module 106 may identify a communication protocol that is associated with or specific to the control command data format. It is noted that the data communication module 106 may identify a communication protocol specific to or associated with the message received from the electronic control units 101, 102, 104 by operating in conjunction with the one or more processors 202 (and other components) of the vehicle system 200 of the vehicle 100, e.g., the one or more memory modules 208.

In embodiments, as the control command may relate to the status or operating condition of one or more components of the vehicle 100 (e.g., airbags, brakes, and so forth), which may be important or necessary for the functioning of the vehicle 100, the data communication module 106 may identify a protocol such as Transmission Control Protocol (TCP). TCP is a connection-oriented protocol that is reliable and typically guarantees the delivery of data to from a source to a destination, e.g., from the data communication module 106 to the cloud server 110. Additionally, TCP provides extensive error checking mechanisms that provide flow control and acknowledgment of data, in addition to enabling retransmission of lost packets. As such, in embodiments, TCP may be identified by the data communication module 106 as suitable for the transmission of messages in the data format of a control command to one or more devices that are external to the vehicle system 200, e.g., the cloud server 110. Other example protocols that ensure safe and secure delivery of data in the control command format are also contemplated.

Additionally, in embodiments, if the data communication module 106 receives a message in the data formats of video streams, digital images, audio messages, and/or text messages, the data communication module 106 may identify communication protocols that are associated with or specific to each of these data formats. For example, as video stream data, digital images, audio message, and so forth, may be not be critical to the operation of the vehicle, communication protocols that enable fast and efficient data transmission may be suitable, e.g., User Datagram Protocol (UDP). While UDP has a basic error checking mechanism, and may not guarantee packet delivery, it provides for rapid retransmission of data and does not require establishing a connection between a source and destination. As such, UDP may be identified by the data communication module 106 as suitable for non-critical messages in certain data formats, e.g., video streams, digital images, audio messages, text messages, and so forth. Other example protocols that having the characteristics of UDP may also be identified as suitable communication protocols for these data formats.

Thereafter, in embodiments, in block 340, the data communication module 106 may transmit messages that are received from the electronic control units 101, 102, 104, to the cloud server 110 that is external to the vehicle system 200 of the vehicle 100 using the communication protocols that are specific to the data formats of these messages. For example, in embodiments, the data communication module 106 may transmit a control command (e.g., received from the electronic control unit 101) to the cloud server 110 using TCP and transmit video streams and/or digital images, audio messages, and text messages (e.g., received from the electronic control units 102, 104) using UDP. It is further noted that the data communication module 106 may include server addresses that may be dedicated for the data formats specific to these messages. For example, the message having the data format of the control command may have a dedicated server address (e.g., a uniform resource locator address or URL), and the messages having the data format of a text message may have a different dedicated server address (e.g., a different uniform resource locator address or URL). In embodiments, the dedicated server address (e.g., URL) may also be specific to and identify each of the electronic control units 101, 102, 104. Additionally, the dedicated server addresses may be stored in the one or more memory modules of each of the electronic control units 101, 102, 104, and/or within the one or more memory modules 208 of the vehicle system 200. Furthermore, in embodiments, the dedicated server addresses may be overwritten by the data communication module 106.

Figure 4:
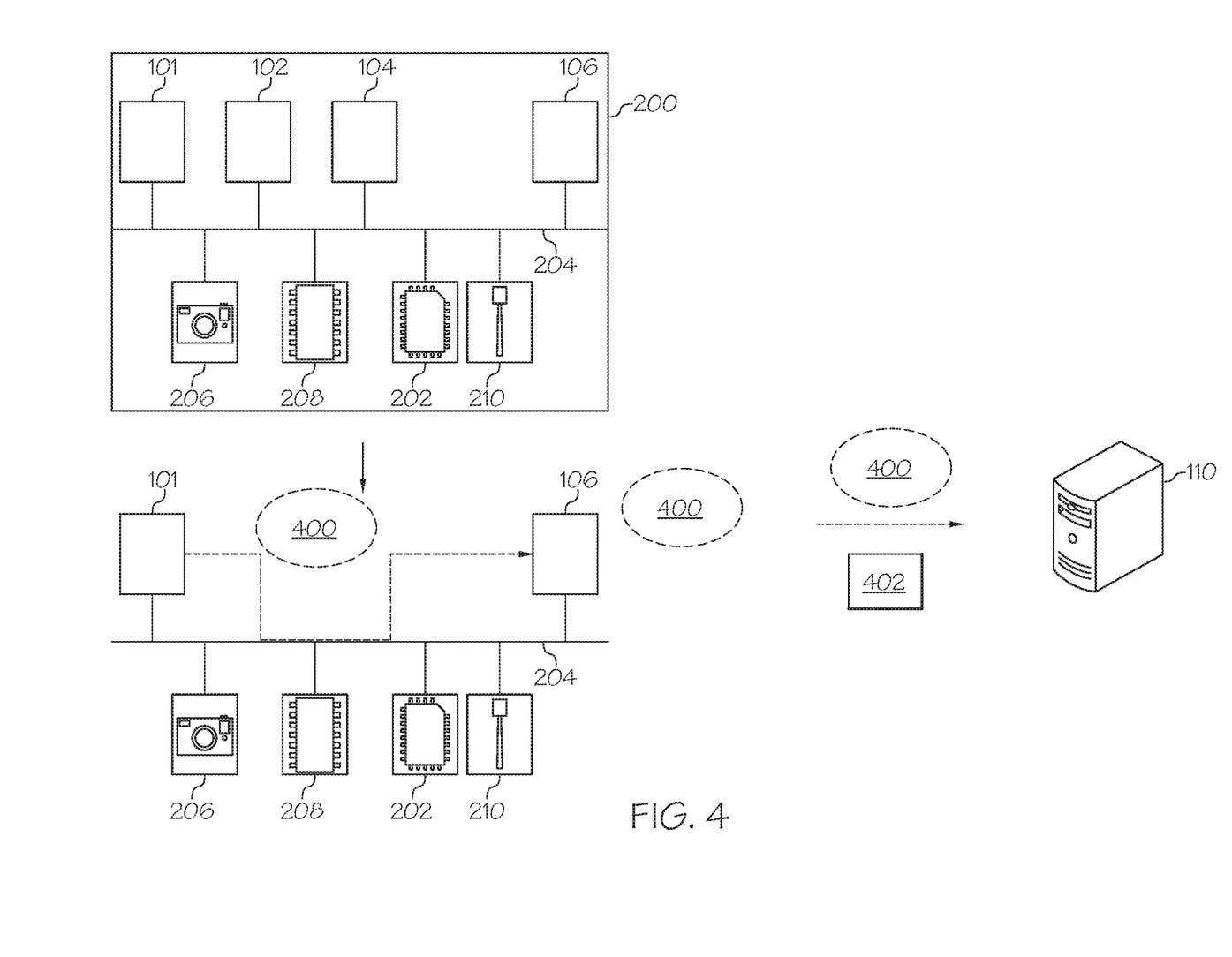
FIG. 4 schematically depicts the vehicle system configured to transmit an exemplary message in the data format of a control command to the server via the data communication module, using a communication protocol that is specific to the data format of the exemplary message, according to one or more embodiments described and illustrated herein.

FIG. 4 schematically depicts the vehicle system 200 described herein that is configured to transmit an exemplary message 400 to the cloud server 110 via the data communication module 106, using a communication protocol that is specific to the data format of the exemplary message 400, according to one or more embodiments described and illustrated herein.

In particular, in the embodiment depicted in FIG. 4, the electronic control unit 101 may generate an exemplary message 400 in the data format of a control command. For example, in embodiments, such a control command based message may be related to the status or operating condition of a critical vehicle component, e.g., operating condition of the brakes, the airbags, vehicle steering, and so forth. As previously stated, in embodiments, the electronic control unit 101 may collect, track, and analyze data gathered in real time from each of these vehicle components (or other vehicle components) to generate the exemplary message 400. It is also noted that the exemplary message 400 may be generated by the electronic control unit 101 independently (using one or more processors included within the electronic control unit 101) and/or in conjunction with the one or more processors 202 of the vehicle system 200. Additionally, in embodiments, the exemplary message 400 generated by the electronic control unit 101 may relate to a status or operating condition (or the like) of an important, but not necessarily critical, component of the vehicle 100. Generating control commands or control command signals related to a plurality of vehicle components of various classifications are contemplated.

Thereafter, the exemplary message 400 may be transferred by the electronic control unit 101 to the data communication module 106 via the communication path 204 of the vehicle system 200. Upon receipt of the exemplar message 400 in the data format of a control command, the data communication module 106 may identify a communication protocol associated with or specific the control command. In embodiments, the data communication module 106 may identify the exemplary communication protocol 402 while operating in conjunction with the one or more processors 202 of the vehicle system 200. In embodiments, as the exemplary message 400 may related to an important or critical vehicle component, namely a status or operating condition of such a component, an exemplary communication protocol 402 that is reliable, reduces transmission errors, and has robust error correcting mechanisms, may be appropriate. As such, in embodiments, the data communication module 106 may identify TCP as a suitable communication protocol. It is noted that the data communication module 106 may identify the communication protocol as TCP by operating in conjunction with the one or more processors 202 (and/or other components of the vehicle system 200).

The data communication module 106 may then transmit the exemplary message 400 to the cloud server 110 using the exemplary communication protocol 402—TCP. In embodiments, the data communication module 106 may have established a connection with the cloud server 110, e.g., via a synchronization and acknowledgment process. Specifically, in accordance with routine TCP procedures, two devices acknowledge a connection between one another upon completion of a synchronization process and after exchanging messages of mutual acknowledgment. After establishing such a connection, the data communication module 106 may safely and securely transmit the exemplary message 400 to the cloud server 110. It is noted that, in embodiments, if a different and more reliable communication protocol were used, the synchronization and acknowledgment process may be bypassed, may vary, or be absent. Other processes are contemplated depending on the identified communication protocol.

In embodiments, the exemplary message 400 may include a dedicated server address (e.g., a uniform resource locator (a.k.a. "URL")) that is specific to the data format of the exemplary message 400, control command in this instance. Additionally, the server address dedicated for the exemplary message 400 may be stored in one or more memory modules of the electronic control unit 101 or in the one or more memory modules 208. In embodiments, this dedicated server address (e.g., dedicated URL) may be overwritten by the data communication module 106. As such, the data communication module 106 is configured to filter, analyze, and control all communications between the electronic control unit 101 and one or more devices external to the vehicle 100, e.g., the cloud server 110.

In embodiments, the exemplary message 400 may be received by the cloud server 110, stored in one or more memory modules 254, and analyzed by one or more processors 252. For example, in embodiments, the exemplary message 400, which may relate to the status or operating condition of a brake, airbags, steering, accelerator (or other such important vehicle components), may be analyzed. Data related to these important vehicle components may be gather and analyzed. Additionally, in embodiments, software updates, firmware upgrades, and so forth, for important or important or critical components of the vehicle 100 may be identified and transmitted by cloud server 110 to the data communication module 106. In embodiments, as such software updates may be important to the operation of one or more components of the vehicle 100, the cloud server 110 may transmit such software updates or software using a safe and secure communication protocol, e.g., TCP.

Figure 5:
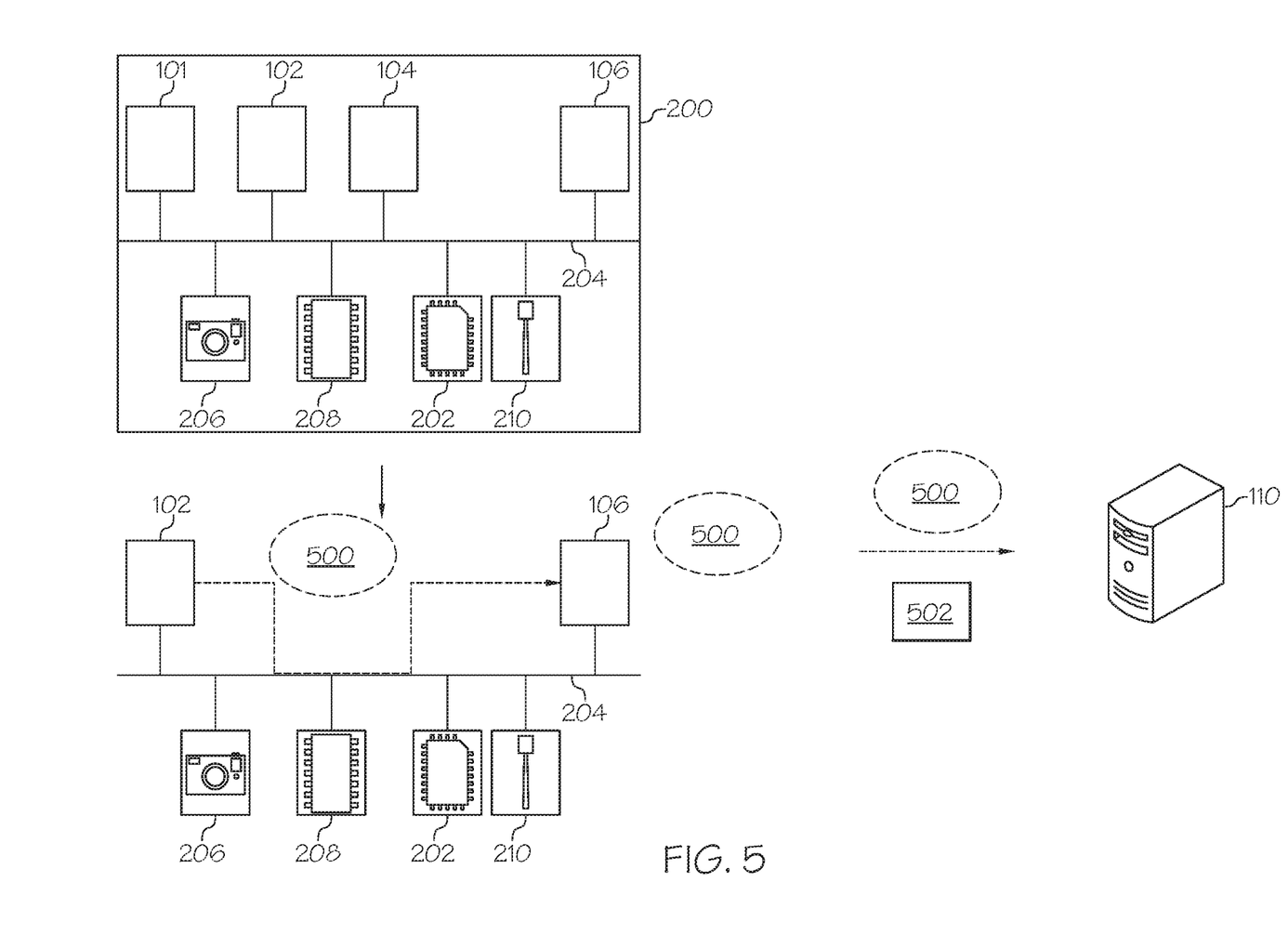
FIG. 5 schematically depicts the vehicle system described herein that is configured to transmit a exemplary message in the data format of a digital image to the server via the data communication module, using a communication protocol that is specific to the data format of the exemplary message, according to one or more embodiments described and illustrated herein.

FIG. 5 schematically depicts the vehicle system 200 described herein that is configured to transmit an exemplary message 500 in the data format of a digital image to the cloud server 110 via the data communication module 106, using a communication protocol that is specific to the data format of the exemplary message 500, according to one or more embodiments described and illustrated herein.

In particular, in the embodiment depicted in FIG. 5, the electronic control unit 102 may generate an exemplary message 500 (e.g., a message that is different from the exemplary message 400 shown in FIG. 4) in the data format of a digital image. Alternatively or additionally, the electronic control unit 102 may generate an exemplary message 500 in the data format of a video stream. In embodiments, the electronic control unit 102 may collect and analyze digital images or video stream from one or more vehicle components of the vehicle system 200, e.g., camera 206 of the vehicle system 200. For example, the camera 206 of the vehicle system 200 may capture a digital image of a monument on the street of a famous city. Alternatively or additionally, the camera 206 may capture a digital image or a live video stream of a particular road sign that is not easily identifiable. The electronic control unit may then generate an exemplary message 500 based on the captured image of the monument or the road sign.

Subsequent to generating the exemplary message 500, the electronic control unit 102 may transfer the exemplary message 500 to the data communication module 106 via the communication path 204. The electronic control unit 102 is substantially similar to the electronic control unit 101, and as such, operates in conjunction with the other components of the vehicle system 200 in substantially the same way as the electronic control unit 101. Descriptions and operating behavior of the electronic control unit 101 described in FIG. 4, in addition to the other descriptions of the components of the vehicle system 200 that are provided in relation to FIG. 3, apply to the operating behavior of the electronic control unit 102.

Thereafter, the data communication module 106 may identify an exemplary communication protocol 502 that is associated with or specific to the data format of the exemplary message 500, digital image in this instance. It is noted that the exemplary communication protocol 502 is different from the exemplary communication protocol 402. As the digital images of the monument and/or the road sign are not critical to the operation of the vehicle system 200, the data communication module may identify a communication protocol that is fast, efficient, and does not have overly burdensome error checking procedures. The data communication module 106 may determine that a communication protocol that suits these criteria is UDP. It is noted that the data communication module 106 may identify the exemplary communication protocol 502 as UDP by operating in conjunction with the one or more processors 202 (and/or other components of the vehicle system 200).

Thereafter, the data communication module 106 may transmit the exemplary message 500 to the cloud server 110 using the exemplary communication protocol 502, UDP in this instance. It is noted that UDP does not require establishing a connection between the vehicle system 200 and the cloud server 110 prior to enabling the data communication module 106 of the vehicle system 200 to transmit the exemplary message 500. Additionally, as a response to the exemplary message 500 may not be critical, the exemplary message 500 may be transmitted in a rapid manner using UDP. Additionally, the exemplary message 500 may include a dedicated server address (e.g., a uniform resource locator (a.k.a. "URL")) that is specific to the data format of the exemplary message 500, digital image in this instance. Additionally, the server address dedicated for the exemplary message 500 may be stored in one or more memory modules of the electronic control unit 102 or in the one or more memory modules 208. In embodiments, this dedicated server address (e.g., dedicated URL) may be overwritten by the data communication module 106.

In embodiments, upon receiving the exemplary message 500, e.g., a digital image of a monument in a city or a road sign that cannot be easily identified, the cloud server 110 may analyze the subject of the received exemplary message 500 and identify the monument (e.g., the colosseum in Rome). Alternatively, the cloud server 110 may translate a road sign (e.g., that points to the location of the colosseum) from Italian to another language. Thereafter, upon performing these actions, the cloud server 110 may transmit data about the monument or a translation of the road sign to the data communication module 106 using UDP. Alternatively, if a digital image of a road sign received by the cloud server 110 depicted important information, e.g., relating to a vehicle accident, and so forth, the cloud server 110 may transmit data related to this road sign using TCP.

Figure 6:
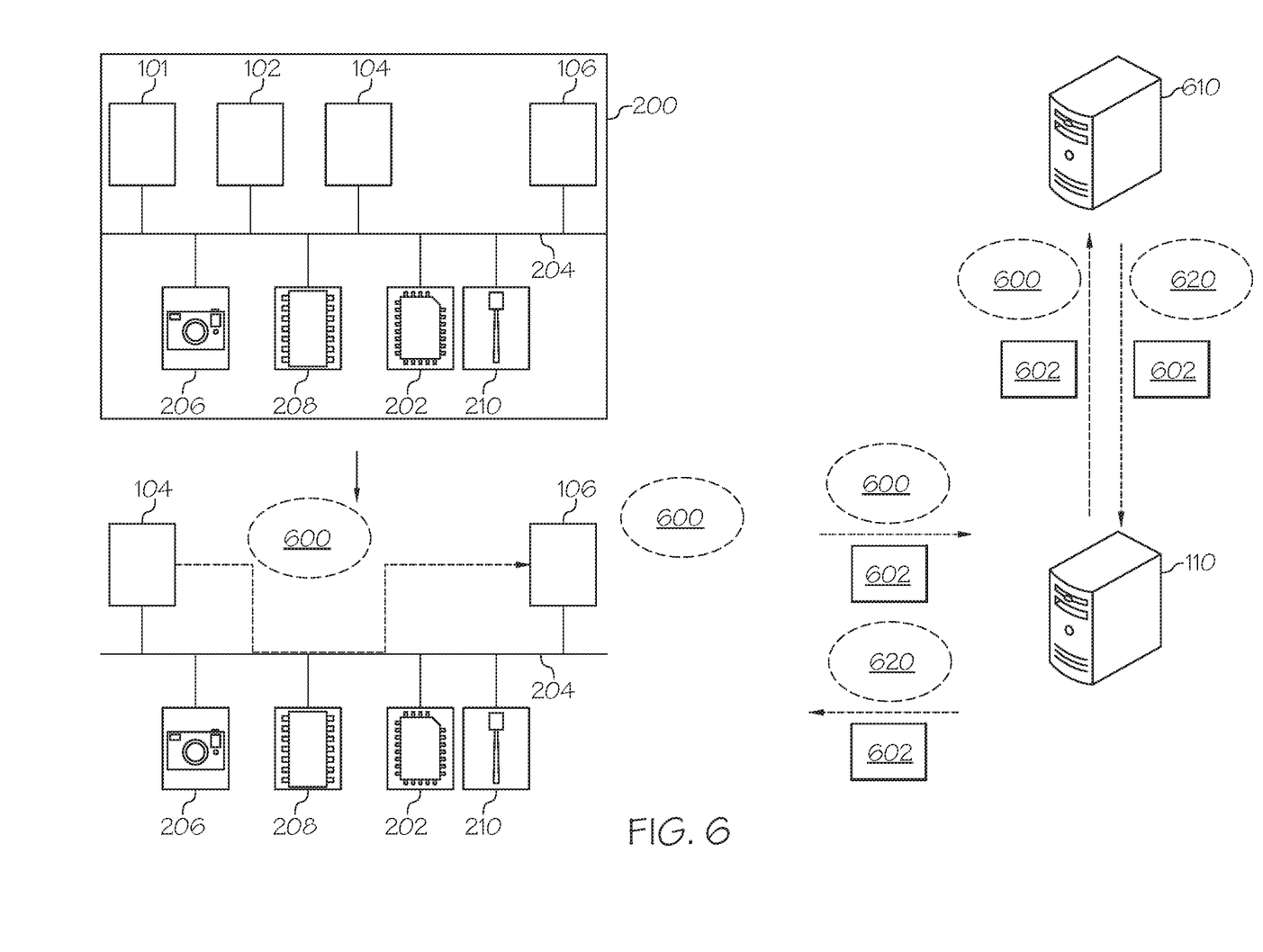
FIG. 6 schematically depicts the vehicle system described herein that is configured to transmit an exemplary message in the form of a text message, according to one or more embodiments described and illustrated herein.

FIG. 6 schematically depicts the vehicle system 200 described herein that is configured to transmit an exemplary message 600 in the form of a text message using a communication protocol that is specific to the data format of the exemplary message 600, according to one or more embodiments described and illustrated herein.

In particular, in the embodiment depicted in FIG. 6, the electronic control unit 104 may generate an exemplary message 600 (e.g., a message that is different from the exemplary messages 400, 500 shown in FIGS. 4 and 5) in the data format of a text message. In embodiments, the electronic control unit 104 may collect and analyze audio data or voice data captured from, e.g., a microphone (not shown) of the vehicle system 200. In embodiments, the microphone may detect a verbal query or command provided by a driver or passenger of the vehicle 100, a question such as "What is the weather forecast tomorrow in Rome". The electronic control unit may then generate an exemplary message 600 based on this query.

Subsequent to generating the exemplary message 600, the electronic control unit 104 may transfer the exemplary message 600 to the data communication module 106 via the communication path 204. The electronic control unit 104 is substantially similar to the electronic control units 101, 102 and as such, operates in conjunction with the other components of the vehicle system 200 in substantially the same way as the electronic control units 101, 102. As such, descriptions and operating behavior of the electronic control units 101, 102 described in FIGS. 4 and 5, in addition to the other descriptions of the components of the vehicle system 200 that are provided in relation to FIG. 3, apply to the operating behavior of electronic control unit 104.

Thereafter, the data communication module 106 may identify an exemplary communication protocol 602 that is associated with or specific to the data format of the exemplary message 600, a text message in this instance. It is noted that the exemplary communication protocol 602 is different from the exemplary communication protocols 402, 502. As a query such as "What is the weather forecast tomorrow in Rome" is not critical to the operation of the vehicle system 200, the data communication module may identify a communication protocol that is fast, efficient, and does not have overly burdensome error checking procedures, e.g., UDP. The data communication module 106 may identify the exemplary communication protocol 602 as UDP by operating in conjunction with the one or more processors 202 (and/or other components of the vehicle system 200).

Thereafter, the data communication module 106 may transmit the exemplary message 600 to the cloud server 110 using the exemplary communication protocol 602, UDP in this instance. The exemplary message 600 may include a dedicated server address (e.g., a uniform resource locator (a.k.a. "URL")) that is specific to the data format of the exemplary message 600. Additionally, the server address dedicated for the exemplary message 600 may be stored in one or more memory modules of the electronic control unit 104 or in the one or more memory modules 208. In embodiments, this dedicated server address (e.g., dedicated URL) may be overwritten by the data communication module 106.

In embodiments, upon receiving the exemplary message 600, e.g., a query such as "What is the weather forecast tomorrow in Rome", the cloud server 110 may analyze the content of the received exemplary message 600 and communicate this message to one or more additional servers, e.g., remote server 610. In embodiments, the cloud server 110 may communicate the exemplary message 600 using exemplary communication protocol 602 to the remote server 610. Thereafter, the remote server 610 may determine one or more responses to the exemplary message 600 (e.g., an answer to the query). In embodiments, the remote server 610 may access data in a database stored in one or more memory modules and determine the pertinent weather forecast in Rome on a particular day. The remote server 610 may then transmit an exemplary response 620 (e.g., the pertinent weather forecast in Rome) to the cloud server 110 using the exemplary communication protocol 602—UDP. The cloud serer may then transmit the exemplary response 620 to the data communication module 106 of the vehicle system 200. In embodiments, the exemplary response 620 may be outputted via a speaker of the vehicle 100 such that a driver or passenger may bear the exemplary response 620.

Figure 7:
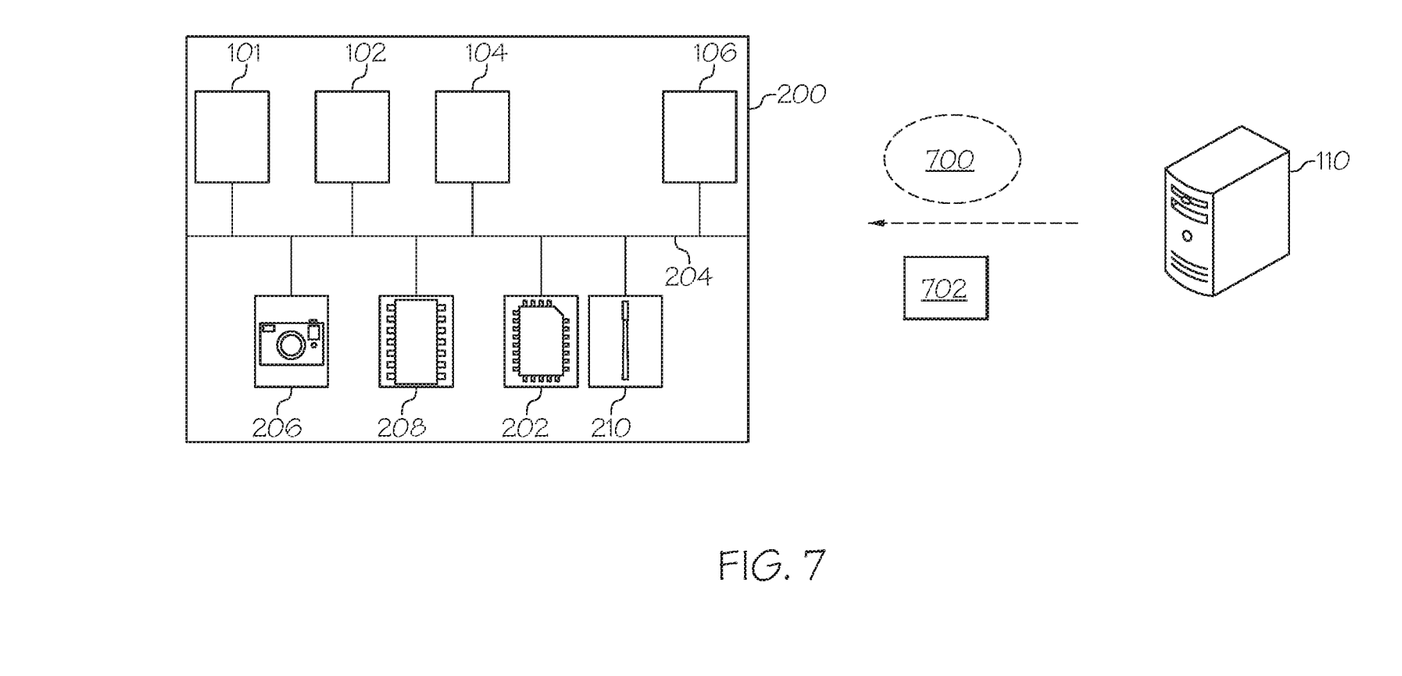
FIG. 7 schematically depicts the vehicle system described herein receiving a wake up signal from the cloud server using a particular communication protocol, according to one or more embodiments described and illustrated herein.

FIG. 7 schematically depicts the vehicle system 200 described herein receiving an exemplary message 700 in the data format of a wake up signal that is transmitted from the cloud server 110 using an exemplary communication protocol 702 that is specific to the wake up signal, according to one or more embodiments described and illustrated herein.

In embodiments, the cloud server 110 may transmit the exemplary message 700 in the data format of a wake up signal to the data communication module 106 of the vehicle system 200 using the exemplary communication protocol 702—TCP. In embodiments, the exemplary message 700 may then be transferred by the data communication module 106 to one or more of the electronic control units 101, 102, 104 in order to alter the status of these units from, e.g., a sleep state to an active state. In embodiments, TCP may be chosen because changing the status or operating condition of an electronic control unit may be considered important to the safe functioning of the vehicle 100.

It should now be understood that the embodiments described herein a method for transmitting messages to external devices by identifying and utilizing communication protocols that are specific to the data formats of these messages. The method includes generating, by an electronic control unit of a vehicle, a message in a data format, transferring, by the electronic control unit, the message in the data format to a data communication module of the vehicle, identifying, by the data communication module, a communication protocol associated with the data format of the message, and transmitting to a server that is external to the vehicle, by the data communication module, the message in the data format using the communication protocol.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
  a data communication module; and
  an electronic control unit programmed to:
    generate a message in a data format;
    transfer the message in the data format to the data communication module, wherein the data communication module is configured to:
    identify, upon receiving the message, a first communication protocol specific to the data format of the message in response to determining that the message is related to predetermined components necessary for a functioning of the vehicle;
    identify, upon receiving the message, a second communication protocol different from the first communication protocol in response to determining that the message is not related to the predetermined components necessary for the functioning of the vehicle; and
    transmit the message, in the first communication protocol specific to the data format of the message or the second communication protocol, to a server that is external to the vehicle.

2. The vehicle of claim 1, further comprising:
  an additional electronic control unit programmed to:
    generate a different message in a different data format; and
    transfer the different message in the different data format to the data communication module.

3. The vehicle of claim 2, wherein the data communication module is further configured to:
  identify, upon receiving the different message, a different communication protocol that is specific to the different data format of the different message; and
  transmit the different message, using the different communication protocol, to the server.

4. The vehicle of claim 3, wherein the different communication protocol that is specific to the different data format is User Datagram Protocol (UDP).

5. The vehicle of claim 2, wherein the different data format of the different message generated by the additional electronic control unit is at least one of a video, a text message, or an audio message.

6. The vehicle of claim 2, wherein the different message that is transmitted to the server by the data communication module includes a different uniform resource locator address specific to the additional electronic control unit.

7. The vehicle of claim 1, wherein the data format of the message generated by the electronic control unit is a control command.

8. The vehicle of claim 7, wherein the first communication protocol specific to the control command is Transmission Control Protocol (TCP).

9. The vehicle of claim 1, wherein the data communication module is configured to receive a wake up signal from the server.

10. The vehicle of claim 1, wherein the message that is transmitted to the server by the data communication module includes a uniform resource locator address specific to the electronic control unit.

11. The vehicle of claim 1, wherein the predetermined components of the vehicle comprise brakes, airbags, a vehicle steering, or combinations thereof.

12. A method comprising:
  generating, by an electronic control unit of a vehicle, a message in a data format;
  transferring, by the electronic control unit, the message in the data format to a data communication module of the vehicle;
  identifying, by the data communication module, a first communication protocol associated with the data format of the message in response to determining that the message is related to predetermined components necessary for a functioning of the vehicle;
  identifying, by the data communication module, a second communication protocol different from the first communication protocol in response to determining that the message is not related to the predetermined components necessary for the functioning of the vehicle; and
  transmitting to a server that is external to the vehicle, by the data communication module, the message in the data format using the first communication protocol or the second communication protocol.

13. The method of claim 12, further comprising:
  generating, by an additional electronic control unit of the vehicle, a different message in a different data format;
  transferring, by the additional electronic control unit, the different message in the different data format to the data communication module of the vehicle;
  identifying in real time, by the data communication module, a different communication protocol that is specific to the different data format; and
  transmitting to the server that is external to the vehicle, by the data communication module, the different message in the different data format using the different communication protocol.

14. The method of claim 13, wherein the different data format of the different message is at least one of a video, a text message, or an audio message.

15. The method of claim 13, wherein the different communication protocol that is specific to the different data format is User Datagram Protocol (UDP).

16. The method of claim 13, wherein the different message that is transmitted to the server by the data communication module includes a different uniform resource locator address specific to the additional electronic control unit, and
  wherein the different uniform resource locator address that is specific to the additional electronic control unit is also specific to the different message in the different data format.

17. The method of claim 12, wherein the data format of the message generated by the electronic control unit is a control command.

18. The method of claim 17, wherein the first communication protocol that is specific to the control command is Transmission Control Protocol (TCP).

19. The method of claim 12, wherein the message that is transmitted to the server by the data communication module includes a uniform resource locator address specific to the electronic control unit.

20. The method of claim 19, wherein the uniform resource locator address that is specific to the electronic control unit is also specific to the message in the data format.

* * * * *

UNITED STATES PATENT AND TRADEMARK OFFICE
CERTIFICATE OF CORRECTION

PATENT NO. : 11,818,234 B2
APPLICATION NO. : 17/085079
DATED : November 14, 2023
INVENTOR(S) : Masashi Nakagawa It is certified that error appears in the above-identified patent and that said Letters Patent is hereby corrected as shown below:

In the Specification

In Column 3, Line 17, after "104", delete "generates" and insert --generate--, therefor.

In Column 4, Line 41, after "each", delete "includes" and insert --include--, therefor.

In Column 9, Line 43, after "may", delete "be".

In Column 9, Line 54, after "that", delete "having" and insert --have--, therefor.

In Column 11, Line 44, after "may be", delete "gather" and insert --gathered--, therefor.

Signed and Sealed this
Fourteenth Day of May, 2024

Katherine Kelly Vidal
*Director of the United States Patent and Trademark Office*